M. HOUDAILLE.
SHOCK ABSORBING APPARATUS.
APPLICATION FILED MAR. 1, 1909.
933,076.
Patented Sept. 7, 1909.
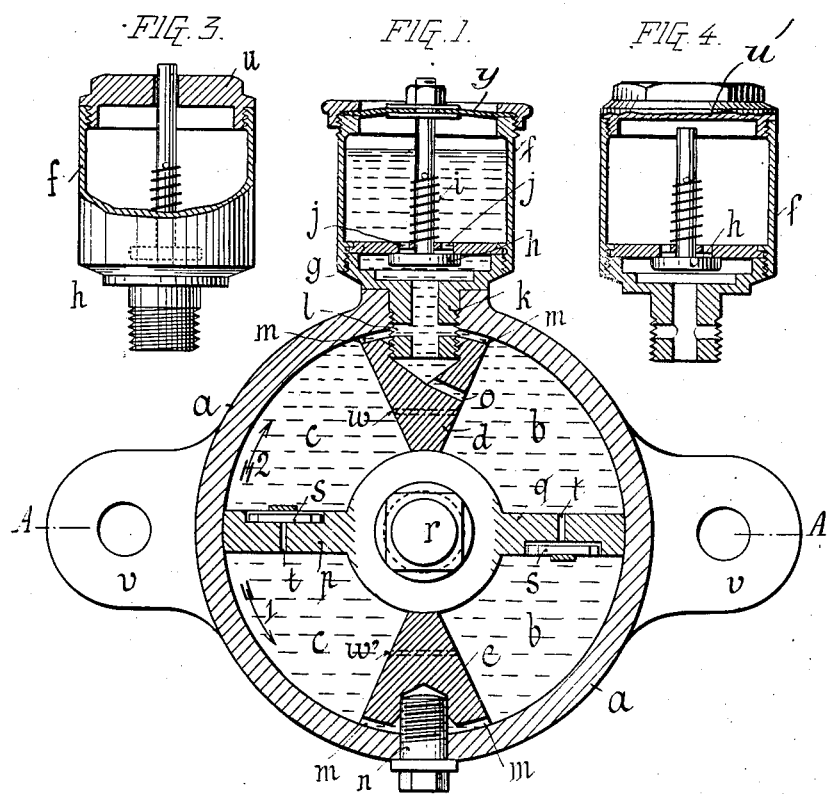
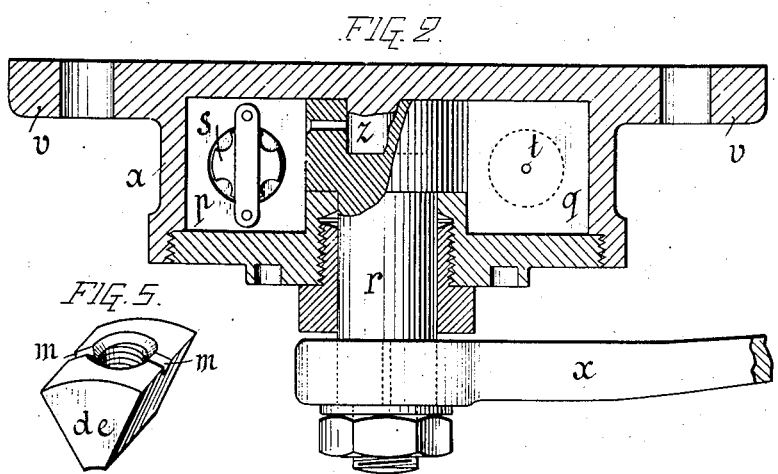

UNITED STATES PATENT OFFICE.

MAURICE HOUDAILLE, OF PARIS, FRANCE.

SHOCK-ABSORBING APPARATUS.

933,076.  Specification of Letters Patent.  Patented Sept. 7, 1909.

Application filed March 1, 1909. Serial No. 480,873.

*To all whom it may concern:*

Be it known that I, MAURICE HOUDAILLE, citizen of the French Republic, residing at Paris, in France, have invented certain new and useful Improvements in Shock-Absorbing Apparatus, of which the following is a specification.

The improvement in shock-absorbing or dash-pot apparatus for motor vehicles and the like forming the subject of this invention consists chiefly in the addition to apparatus of the type in which a piston moves in a liquid in a containing vessel of a tank or auxiliary vessel containing a reserve of the liquid for compensating for the loss which takes place through evaporation, leakage, etc., and results in the derangement and bad working of the apparatus. The transfer of the liquid from the reserve tank to the main vessel can be regulated by means of a valve or like closing member, preferably working automatically under the action of the vacuum to be compensated for, but arrangement may be made whereby the valve may also be operated by hand.

In the following description and the accompanying drawing the device forming the subject of this invention is assumed to be applied to shock-absorbing apparatus of the so-called rotary piston type, but obviously it can be applied also to reciprocating pistons, the reserve or compensating tank in either case being connected by means of a suitable conduit to one of the chambers of the vessel in which the piston works.

In the accompanying drawing given by way of example, Figure 1 is a vertical section through apparatus provided with a device according to this invention. Fig. 2 is a horizontal section on the line A—A of Fig. 1. Figs. 3 and 4 show in vertical section and elevation with parts broken away, modified constructions of the same device, and Fig. 5 shows in perspective one of the constituent parts of the apparatus.

With reference to Figs. 1 and 2 $a$ is a cylindrical vessel divided diametrically into two compartments $b$ $c$ by segment-shaped partitions $d$ and $e$. In one of these partitions is connected the nozzle $k$ of a reserve tank $f$. This tank is provided, at a slight distance from its bottom, with a horizontal partition $g$ through the center of which passes the spindle of a valve $h$ arranged in the space formed between the bottom of the tank and the partition $g$ and tending, under the action of a weak spring $i$, to close the orifices $j$ with which the said partition is provided around the spindle of the valve.

The nozzle $k$ is provided with holes $l$ opening into a recess in the segment-like partition $d$, from which recess lead grooves $m$ (Fig. 5) which, in combination with the wall of the cylindrical vessel $a$, form conduits of comparatively small cross-section through which the liquid contained in the apparatus can pass with a limited velocity from one of the compartments $b$ $c$ into the other. The bottom partition $e$ is also provided with similar grooves $m$ connected by a recess formed at the top of the hole for the screw $n$ which secures the partition $e$ to the wall of the vessel $a$. This hole is used for the initial filling of the apparatus for which operation it is held reversed, the air escaping through the grooves $m$. In addition to its grooves $m$ the upper partition $d$ is provided with a hole $o$ establishing communication between the nozzle $k$ and the compartment $b$.

The pistons $p$ and $q$ secured to the spindle $r$ and traveling in the compartments $b$ and $c$ respectively are provided with valves $s$ arranged to close passages $t$ in order to prevent any circulation of the liquid from taking place through the passages during the rotation of the pistons in one direction, and to open the holes or passages and allow the liquid to pass through when the movement of the pistons is in the opposite direction.

For some vehicles the pistons need not be provided with the valves, but in such cases each segment $d$ and $e$ would be made with a small passage $w$ shown dotted in Fig. 1 to connect the compartments $b$ and $c$. The spindle $r$ is centered relatively to the cylindrical vessel $a$ by means of a recess which engages with a projection $z$ on the side wall of the vessel.

The cylindrical vessel $a$ may be secured by means of lugs $v$ to one of the parts of the elastic suspension of a vehicle, for instance to the chassis, while the spindle $r$ may be connected by a crank $x$ to another part, for example to the axle or to a point on the suspension spring.

The operation of the movable portions of the apparatus when under the action of a violent shock is as follows:—The pistons $p$, $q$, driven by the spindle $r$ move in the direction of the arrow 1, the valves $s$ open to admit liquid through the holes $t$, and at the same time the liquid passes from one compartment into the other through the grooves $m$. On the other hand when the pistons move in the direction of the arrow 2 the valves $s$ are closed so that the liquid can circulate only through the grooves $m$. The result is a difference in the circulation of the liquid according to the direction of the rotation of the spindle $r$, this difference being utilized for deadening the sudden return of the parts when moving in one direction. When it is desired to have the same deadening action whatever the direction of motion of the pistons, the valves $s$ are dispensed with.

If during the working of the apparatus or while it is idle a loss of liquid occurs, such loss is automatically made up by the operation of the valve $h$ which is opened either by the action of the liquid contained in the tank $f$ or of the suction produced by one of the pistons $p$ or $q$ during its movement while its valve $s$ is closed.

In the construction shown in Fig. 1 the tank or auxiliary vessel $f$ is covered by a flexible diaphragm $y$ to which the valve stem is attached. The upper end of the stem extends above the diaphragm so that the valve may be manually depressed to open the orifices $j$. In the modified construction shown in Fig. 3, the spindle or valve $h$ passes freely through a cover $u$ and projects externally thereof, thus enabling the valve to be operated by hand and of course the valve $h$ in this construction as well as that shown in Fig. 1 is adapted to operate automatically by the suction produced by the pistons or the action of the liquid in the tank $f$. In the form of the invention shown in Fig. 4, it is impossible to adjust the valve manually as the tank or auxiliary vessel $f$ is closed by an imperforate cover $u'$, the operation of the valve in this form being entirely automatic.

The provision according to this invention of an auxiliary vessel or compensating tank enables comparatively fluid substances, such for instance as glycerin, to be used instead of grease or other thick lubricants which, owing to what may be termed a churning action, quickly become hardened and work badly. Hitherto the use of liquids has had a serious drawback on account of leakage, but this disadvantage is obviated by the present invention.

What I claim as my invention and desire to secure by Letters Patent is:—

1. In shock-absorbing or dash-pot apparatus for motor vehicles and the like, the combination of a vessel containing liquid, a piston movable therein, an auxiliary vessel adapted to contain a reserve of the liquid, a conduit between the auxiliary vessel and the main vessel, and means whereby normally the liquid in the auxiliary vessel will not be affected by movement of the piston, said means being automatically adjusted to allow liquid to pass from the auxiliary vessel to the main vessel to compensate for leakage from the main vessel.

2. In shock-absorbing or dash-pot apparatus for motor vehicles and the like, the combination of a vessel containing liquid, a piston movable therein, an auxiliary vessel adapted to contain a reserve of the liquid, a conduit between the auxiliary vessel and the main vessel, and a valve controlling such conduit, and normally preventing the liquid in the auxiliary vessel from being affected by movements of the piston, said valve being automatically adjusted to permit liquid to pass from the auxiliary vessel to the main vessel to replace liquid escaping from the latter vessel.

3. In shock-absorbing or dash-pot apparatus for motor vehicles and the like, the combination of a vessel containing liquid, a piston movable therein, an auxiliary vessel adapted to contain a reserve of the liquid, a conduit between the auxiliary vessel and the main vessel, and a spring-controlled valve controlling such conduit, and having its stem extending to the outside of the casing in which the valve is arranged, said valve normally preventing the liquid in the auxiliary vessel from being affected by movements of the piston.

4. In shock-absorbing or dash-pot apparatus for motor vehicles and the like, the combination of a vessel containing liquid, a piston movable therein, an auxiliary vessel adapted to contain a reserve of the liquid, a conduit between the auxiliary vessel and the main vessel, and a spring-controlled valve controlling such conduit and normally preventing the liquid in the auxiliary vessel from being affected by movements of the piston, said valve being automatically adjusted to permit liquid to pass from the auxiliary vessel to the main vessel to compensate for liquid escaping from the latter vessel, also capable of being operated by hand.

5. In shock-absorbing or dash-pot apparatus for motor vehicles and the like, the combination of a vessel containing liquid, a piston movable therein, an auxiliary vessel adapted to contain a reserve of the liquid, a conduit between the auxiliary vessel and the main vessel, a flexible diaphragm cover to the auxiliary vessel, and a valve controlling the conduit and fixed to such cover.

6. In shock-absorbing or dash-pot apparatus for motor vehicles and the like, the combination of a circular vessel divided into a plurality of compartments $b$ $c$ communicating through narrow conduits $m$, a member $r$ capable of limited rotary motion in such vessel, piston blades $p$ $q$ mounted on said member, an auxiliary vessel adapted to contain a reserve of liquid, a conduit between the auxiliary vessel and the main vessel, and a valve controlling such conduit, and normally preventing liquid in the auxiliary vessel from being affected by movements of the piston, said valve being automatically adjusted by the action of the piston to permit liquid to pass from the auxiliary vessel to the main vessel to maintain the quantity of liquid in the main vessel constant.

7. In shock-absorbing or dash-pot apparatus for motor vehicles and the like, the combination of a circular vessel divided into a plurality of compartments $b$ $c$ communicating through narrow conduits $m$, a member $r$ capable of limited rotary motion in such vessel, piston blades $p$ $q$ mounted on said member, valve controlled openings $t$ in the piston blades, an auxiliary vessel $f$ adapted to contain a reserve of liquid, a conduit between the auxiliary vessel and the main vessel, a flexible diaphragm cover $y$ to the auxiliary vessel, and a spring-controlled valve $h$ controlling the conduit and attached to the diaphragm cover.

8. In an apparatus of the character described, the combination of a vessel containing liquid, a piston movable therein, an auxiliary vessel adapted to contain a reserve of liquid and having an aperture communicating with the main vessel, a flexible diaphragh covering the auxiliary vessel, and a valve controlling the outlet aperture from said vessel and having its stem extending through and connected to said diaphragm.

In testimony whereof I have signed my name to this specification in the presence of two subscribing witnesses.

MAURICE HOUDAILLE.

Witnesses:
H. C. COXE,
GEORGES BONNEUIL.